(12) United States Patent
Brown et al.

(10) Patent No.: US 8,881,322 B2
(45) Date of Patent: *Nov. 11, 2014

(54) DOMESTIC APPLIANCE

(71) Applicant: Dyson Technology Limited, Wiltshire (GB)

(72) Inventors: Andre David Brown, Malmesbury (GB); Stephen Benjamin Courtney, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,154

(22) Filed: Dec. 11, 2012

(65) Prior Publication Data

US 2013/0152301 A1    Jun. 20, 2013

(30) Foreign Application Priority Data

Dec. 12, 2011  (GB) .................................. 1121297.4

(51) Int. Cl.
| | |
|---|---|
| *E03C 1/18* | (2006.01) |
| *E03C 1/186* | (2006.01) |
| *F24D 17/00* | (2006.01) |
| *F28D 1/06* | (2006.01) |
| *F28D 21/00* | (2006.01) |
| *E03C 1/00* | (2006.01) |

(52) U.S. Cl.
CPC .............. *E03C 1/18* (2013.01); *F24D 17/0052* (2013.01); *F28D 1/06* (2013.01); *F28D 21/0012* (2013.01); *E03C 2001/005* (2013.01)
USPC ........................................................... 4/638

(58) Field of Classification Search
CPC ..................................... E03C 1/00; E03C 1/18
USPC ...................................... 4/619–660, 515–523
See application file for complete search history.

(56) References Cited

U.S. PATENT DOCUMENTS

| | | |
|---|---|---|
| 4,291,423 A | 9/1981 | Wilson |
| 2013/0152302 A1 | 6/2013 | Brown et al. |
| 2013/0152303 A1 | 6/2013 | Brown et al. |

FOREIGN PATENT DOCUMENTS

| | | |
|---|---|---|
| CN | 202324084 | 7/2012 |
| DE | 3045116 | 7/1982 |
| DE | 44 06 971 | 10/1994 |
| DE | 4406971 | * 10/1994 |
| DE | 200 18 521 | 5/2001 |
| EP | 0 466 107 | 1/1992 |

(Continued)

OTHER PUBLICATIONS

Search Report and Written Opinion mailed Mar. 4, 2013, directed to International Application No. PCT/GB2012/053055; 7 pages.

(Continued)

*Primary Examiner* — Lori Baker
(74) *Attorney, Agent, or Firm* — Morrison & Foerster LLP (57) ABSTRACT

A hand washing station has a receptacle with a raised or domed portion, a fluid dispenser for dispensing a relatively hot fluid, a drain for draining fluid from the receptacle, and a cooling jacket for conveying a relatively cold fluid beneath the raised portion of the receptacle. The raised portion of the receptacle forms part of a heat exchanger for transferring heat from the relatively hot fluid within the receptacle to the relatively cold fluid within the cooling jacket.

23 Claims, 7 Drawing Sheets

(56) References Cited

FOREIGN PATENT DOCUMENTS

| | | | |
|---|---|---|---|
| GB | 878572 | | 10/1961 |
| JP | 4-49924 | | 2/1992 |
| JP | 11-94356 | | 4/1999 |
| JP | 2009-66200 | | 4/2009 |
| NL | 1009927 | * | 9/2000 |
| WO | WO-2008/014878 | | 2/2008 |
| WO | WO-2009/110494 | | 9/2009 |

OTHER PUBLICATIONS

Brown et al., U.S. Office Action mailed Feb. 27, 2014, directed to U.S. Appl. No. 13/711,182; 5 pages.

Brown et al., U.S. Office Action mailed Feb. 27, 2014, directed to U.S. Appl. No. 13/711,200; 6 pages.

Brown et al., U.S. Office Action mailed Oct. 9, 2013, directed to U.S. Appl. No. 13/711,182; 8 pages.

Brown et al., U.S. Office Action mailed Oct. 10, 2013, directed to U.S. Appl. No. 13/711,200; 7 pages.

* cited by examiner

DOMESTIC APPLIANCE

REFERENCE TO RELATED APPLICATIONS

This application claims the priority of United Kingdom Application No. 1121297.4, filed 12 Dec. 2011, the entire contents of which are incorporated herein by reference.

FIELD OF THE INVENTION

The present invention relates to a hand washing station. In one example, the hand washing station is in the form of a sink unit which may be installed in a washroom.

BACKGROUND OF THE INVENTION

As is known, a sink unit comprises at least one fluid dispenser, usually in the form of a tap for dispensing water, for dispensing fluid into a receptacle, and a drain for draining the dispensed fluid from the receptacle. The sink unit may be provided with a single tap for dispensing water over a range of different temperatures, or two taps each of dispensing water of a respective temperature. The fluid dispenser may be located adjacent to the receptacle, mounted on the receptacle, or located on a wall.

The amount of energy used per year to heat water supplied to a sink unit can be significant. By way of example, a sink unit located in a public washroom with a medium footfall may be subject to around 200 uses per day. If each user of the sink unit chooses to wash with relatively hot water, typically dispensed at around 40° C., and to use around 330 ml of water per wash (calculated from a dispensed flow rate of 2 liters per minute and a wash time of 10 seconds) then the energy required to heat the water supplied to the sink unit over the course of the year from a temperature of around 18° C. to 40° C., may be around 625 kWh.

The temperature drop in the dispensed hot water as the dispensed water passes through the air and then over the hands of the user and on to the external surface of the receptacle to the drain is generally around 5° C. Consequently, the energy wasted as the hot water is expelled through the drain of the sink unit may be around 485 kWh per year.

It is known to provide a system for transferring heat from waste hot water expelled from the drain of a receptacle to incoming cold water to be supplied to the receptacle, and so reduce the amount of energy required to heat the incoming cold water before it is dispensed. For example, U.S. Pat. No. 4,291,423 describes a heat recovery system in which the waste hot water is conveyed from a receptacle to a channel located beneath the receptacle and housing a tube containing the incoming cold water. Heat is transferred from the waste hot water to the incoming cold water through the body of the tube. However, the build up of soap, scum and hard water scale on the outer surface of the tube can impair the transfer of heat to the incoming cold water, and so the receptacle needs to be removable to enable a user to access the heat recovery system for cleaning. This can be inconvenient for the user.

SUMMARY OF THE INVENTION

In a first aspect the present invention provides a hand washing station or unit, for example a sink unit, comprising a receptacle having a drain, and a fluid dispenser for dispensing fluid into the receptacle, the receptacle comprising a heat exchanger for transferring heat between the dispensed fluid and a second fluid, the heat exchanger forming at least part of an external surface of the receptacle.

The heat exchanger thus forms part of the receptacle into which fluid is dispensed. The heat exchanger is arranged to transfer heat between the dispensed fluid and a second fluid, which may be at a lower temperature than the dispensed fluid within the receptacle. This allows the heat exchanger to extract heat from the dispensed fluid before the dispensed fluid enters the drain, and so following only a relatively small drop in temperature of the dispensed fluid, for example through contact with a user's hands and/or air. This can significantly improve the recovery of heat from the dispensed fluid in comparison to a thermal recovery system in which heat is transferred from the dispensed fluid following its exhaust from the drain or admission into an enclosed channel, as described in U.S. Pat. No. 4,291,423, and thus following a greater drop in its temperature. As used herein, the term "external surface of the receptacle" includes any surface which is contacted by the dispensed fluid before the dispensed fluid enters the drain of the receptacle. The receptacle may be in the form of a bowl or basin into which fluid is dispensed.

The location of the heat exchanger so that it forms at least part of an external surface of the receptacle into which the fluid is dispensed can enable the external surface of the heat exchanger, which is in thermal contact with the dispensed fluid, to be readily cleaned by a user. Through regular cleaning of the external surface of the receptacle, usually performed at least two or three times per day in a public washroom, the external surface of the heat exchanger can also be kept clean, thereby maintaining the efficiency of the heat exchanger.

This location of the heat exchanger places the external surface of the heat exchanger in contact with another fluid other than the dispensed fluid, such as the air in the ambient atmosphere. Depending on the relative temperatures of the ambient atmosphere and the second fluid, the heat exchanger can transfer heat from a relatively hot ambient atmosphere to a relatively cold second fluid when there is no dispensed fluid within the receptacle. For example, there are various heat sources within a public washroom which may contribute to heating the air above the temperature of the second fluid, including users of the washroom, hot air hand driers, and radiators. Alternatively, when the ambient atmosphere is relatively cold the heat exchanger can transfer heat to the relatively cold ambient atmosphere from the relatively hot second fluid.

Therefore, in a second aspect the present invention provides a hand washing station comprising a receptacle, the receptacle comprising a heat exchanger having an external surface for thermally contacting a fluid at a first temperature and an internal surface for thermally contacting a fluid at a second temperature, the external surface of the heat exchanger forming at least part of the external surface of the receptacle.

As discussed above, the fluid at the first temperature may be hotter, or colder, than the fluid at the second temperature. The fluid at the first temperature may be a dispensed fluid, such as dispensed water or dispensed air, or air within the ambient atmosphere. For example, air may be dispensed from a fan for circulating air with a washroom or locally adjacent to the receptacle, or from a hand dryer. This fluid at the first temperature is referred to hereafter as "the dispensed fluid". The fluid at the second temperature is referred to hereafter as "the second fluid", and this may be water received from a mains water supply, or air. For example, the air may be pumped to the hand washing station from an external source, or from air located outside a washroom in which the hand washing station is installed. The second fluid may be subsequently utilised to form the dispensed fluid, and so the dispensed fluid and the second fluid may vary from one another solely through their respective temperatures.

The external surface of the heat exchanger may have any desired shape. For example, the external surface of the heat exchanger may form a generally flat or planar external surface of the receptacle which contacts the dispensed fluid and/or the ambient atmosphere. However, to increase the area of the external surface of the heat exchanger, and so increase the surface area available for heat transfer within a given receptacle space, the heat exchanger preferably forms at least part of a raised external surface of the receptacle. Alternatively, or additionally, the external surface of the heat exchanger may form a concave external surface of the receptacle for guiding the dispensed fluid towards the drain.

To optimise the transfer of fluid to the second fluid, it is preferable to convey a flow of the second fluid over or adjacent to an internal surface of the heat exchanger in a direction which is opposite to the direction in which the dispensed fluid flows over the external surface of the heat exchanger. Providing at least part of the external surface of the heat exchanger with a raised shape, such as a domed or convex shape, can enable the sink unit to be arranged, for example through selection of at least one of the relative positions of the dispenser and the heat exchanger, the shape of the dispenser, and the rate at which fluid is dispensed, so that the dispensed fluid will flow over the external surface of the heat exchanger in a common direction, that is, away from an apex of the raised surface. The second fluid may then be conveyed over or adjacent to the concave internal surface of the heat exchanger towards the apex.

A benefit of forming the heat exchanger with a convex external surface is that the dispensed fluid can tend to form a relatively thin film over the convex surface, with a reduced surface area in comparison to that of many water droplets running over the convex surface. This can reduce the degree of evaporative cooling of the dispensed fluid, and so maximise the transfer of heat through the heat exchanger. The external surface of the heat exchanger is preferably formed from, or coated with, a hydrophilic material to promote the spreading of the dispensed fluid over the heat exchanger, and so promote the transfer of heat through the (relatively conductive) heat exchanger rather than to the (relatively insulating) ambient atmosphere.

The raised portion of the heat exchanger may have any desired geometrical shape. For example, the raised portion of the heat exchanger may have a domed, cylindrical, conical, frusto-conical or polyhedral shape. The heat exchanger preferably forms at least part of an external surface of the receptacle which has a substantially spherical curvature so that the dispensed fluid spreads evenly over the heat exchanger to form a laminar film. As a hemisphere has twice the surface area of a circular flat disc of equal radius, shaping the heat exchanger in this manner can maximise the volume of fluid in thermal contact with the heat exchanger per second, and so maximise the rate of heat transfer to the second fluid. With this shape, the heat exchanger may also be relatively insensitive to the installation angle of the heat exchanger relative to the fluid dispenser.

A sphere is also one of the strongest and robust of three dimensional shapes, and this can enable at least the section of the heat exchanger which forms this spherical section of the external surface of the receptacle to be formed from material having a thickness of less than 5 mm, preferably less than 2 mm and more preferably less than 1 mm. This can reduce the time taken to heat the heat exchanger to the temperature of the dispensed fluid, and can reduce the amount of heat that is retained by the heat exchanger between uses of the sink unit. The thickness of the heat exchanger and hence its material volume is proportional the thermal inertia and the sensitivity of the heat exchanging system. A low inertia heat exchanging system can respond rapidly to small changes in temperature, allowing heat to be transferred between the ambient atmosphere and the second fluid.

The heat exchanger may thus form a flat, domed, convex, cylindrical, conical, frusto-conical, polyhedral, hemispherical, spheroidal or spherical part of the receptacle. This part of the receptacle may be proud of at least part of an external surface of a base of the receptacle. Dispensed fluid may then flow over this part of the receptacle and on to the base before being exhausted through the drain. The receptacle may have a side wall connected to the base, and which extends about the heat exchanger. Alternatively, the heat exchanger may be located above the side wall of the receptacle.

The heat exchanger may be a separate component from the base of the receptacle. For example, the heat exchanger may be connected to the base of the receptacle so that the heat exchanger is located above the drain of the receptacle. The heat exchanger may be connected to the base of the receptacle by a plurality of supports extending about the periphery of the heat exchanger so that dispensed fluid may run off the edge of the heat exchanger and subsequently pass beneath the heat exchanger to the drain. The heat exchanger may be removably connected to the receptacle to allow the heat exchanger to be cleaned, repaired or replaced without having to remove any other part of the receptacle.

In a preferred embodiment, the heat exchanger is integral with the receptacle. The heat exchanger preferably forms at least part of the external surface of the base of the receptacle. For the reasons discussed above, the heat exchanger preferably forms at least part of a raised section of the base. This raised section of the base is preferably convex in shape, and preferably has a substantially spherical curvature. In a preferred embodiment, the heat exchanger forms a hemispherical section of the external surface of the base of the receptacle. The sink unit is preferably arranged so that the fluid is dispensed directly on to the raised section of the base so that, when the flow of dispensed fluid does not impinge upon a user's hands, the external surface of the raised section of the receptacle can be substantially evenly coated with the dispensed fluid as it flows towards the drain. For example, the fluid dispenser may be arranged such that the dispensed fluid is dispensed on to the apex of the raised section of the receptacle.

In a preferred embodiment, the receptacle comprises a side wall. As an alternative from, or in addition to, the heat exchanger forming part of the base of the receptacle, the heat exchanger may form at least part of the external surface of the side wall of the receptacle. This can enable heat to be extracted from dispensed fluid which has splashed from a user's hands on to the external surface of the side wall of the receptacle, and can also enable heat to be extracted between the ambient atmosphere and the second fluid. The side wall preferably extends about the raised section of the base, and the drain is preferably located between the side wall and the raised section of the base. The drain may comprise either a single fluid port, or a plurality of fluid ports spaced about the raised section of the base, through which fluid drains from the receptacle to an external waste pipe.

The heat exchanger may comprise a single sheet of material which is shaped to form at least part of the external surface of the receptacle. The drain may be formed from punching or otherwise removing material from this sheet of material. The sheet of material is preferably formed from metallic material, for example a stainless steel, so that the heat exchanger has a relatively high thermal conductivity. A coating of hydrophilic material may be deposited or otherwise disposed on this sheet of material to form the external surface of the heat exchanger. Alternatively, the heat exchanger may comprise a plurality of layers of material, with one layer of material forming the external surface of the heat exchanger and another layer of material forming the internal surface of the heat exchanger. In this case, the layers of the heat exchanger may be formed from the same material or from different materials. For example, an external surface of the heat exchanger may be formed from a sheet of stainless steel whereas an internal surface of the heat exchanger may be formed from a sheet of a different metallic material to reduce manufacturing costs, or from a sheet of plastics material to further separate the different fluid streams for reasons of water safety.

The receptacle preferably comprises means for conveying a flow of the second fluid adjacent to or over an internal surface of the heat exchanger, so that the second fluid is placed in thermal contact with the heat exchanger to exchange heat with fluid within the receptacle. The fluid conveying means is preferably arranged to convey the second fluid over or adjacent to the internal surface of the heat exchanger in a direction substantially opposite to that in which the dispensed fluid flows over the external surface of the heat exchanger. For example, where the heat exchanger comprises a convex section defining a convex external surface over which the dispensed fluid flows, the fluid conveying means is preferably arranged to convey the second fluid internally towards an apex of the convex section of the heat exchanger.

The fluid conveying means may comprise at least one conduit for conveying fluid adjacent the internal surface of the heat exchanger. For example, the fluid conveying means may comprise one or more pipes or tubes which are arranged adjacent to the internal surface of the heat exchanger to place the second fluid in thermal contact with the internal surface of the heat exchanger. For example, the pipe(s) may be wound about a body or a casing over which the receptacle is located so that the pipe(s) are located internally opposite to the external surface of the heat exchanger.

In this case, the heat transferred between the dispensed fluid and the second fluid must also pass though the pipe(s), and so some of this heat may be utilised to raise the temperature of the pipe(s) as opposed to raising the temperature of a relatively cold fluid. In view of this, in a preferred embodiment the receptacle comprises an enclosed fluid passage in the form of a cooling jacket delimited at least in part by the internal surface of the heat exchanger so that no additional thermal mass needs to be heated to conduct heat from relatively hot fluid to relatively cold fluid. The cooling jacket may extend over substantially the entire internal surface of the heat exchanger, and thus may extend over both the internal surface of the base of the receptacle and the internal surface of the side walls of the receptacle. Alternatively, the cooling jacket may extend over selected sections of the internal surface of the receptacle.

The receptacle preferably comprises a casing extending about the heat exchanger, and the cooling jacket is preferably located between, and more preferably delimited by, the heat exchanger and the casing. The internal surface of the heat exchanger and the internal surface of the casing preferably have substantially the same shape so that the cooling jacket has a uniform thickness about the heat exchanger. The casing may be arranged to transfer heat between fluid within the cooling jacket and the ambient atmosphere in thermal contact with the external surface of the casing. An air dispenser, such as a fan, may be provided for dispensing air over the external surface of the casing so that heat can be transferred between the dispensed air and the fluid within the cooling jacket. In this case, the casing may also form a heat exchanger of the receptacle. For example, the casing may be formed from metallic material, such as a stainless steel. Alternatively, the casing may be formed from a thermally insulating material to inhibit loss of heat through the casing.

The casing preferably has a side wall comprising at least one fluid inlet port through which the second fluid enters the cooling jacket. The cooling jacket may then convey fluid over the internal surface of the side wall of the heat exchanger. The cooling jacket may comprise a plurality of fluid inlet ports arranged about the side wall of the casing for distributing evenly the second fluid over the internal surface of the heat exchanger. An annular distribution jacket may be provided for supplying fluid to the fluid inlet ports. Where the base of the heat exchanger comprises a raised section having a convex external surface, a fluid outlet port of the cooling jacket is preferably located opposite to the apex of the convex external surface.

The sink unit preferably comprises an inlet conduit for supplying fluid to the cooling jacket. The inlet conduit may be connected to a mains water supply, which may have a high water pressure, for example up to 10 bar. As an increase in the thickness of the heat exchanger—to allow the receptacle to withstand a high pressure cold water supply to the cooling jacket—may be detrimental to the transfer of heat through the heat exchanger, the inlet conduit may comprise a pressure reducing valve for reducing the static pressure of the second fluid before it enters the cooling jacket. This can also inhibit any leakage of fluid from the cooling jacket through reducing the likelihood of any leaks forming within any seals or connections between the heat exchanger and the casing due to the pressure of the fluid within the cooling jacket. The inlet conduit may comprise a solenoid valve or other valve for selectively inhibiting the flow of fluid to the cooling jacket.

The sink unit may comprise an outlet conduit for conveying fluid from the cooling jacket to the fluid dispenser. A second valve, preferably a solenoid valve, may be provided between the cooling jacket and the fluid dispenser for inhibiting the dispensing of fluid from the fluid dispenser. This second valve may be located in the outlet conduit, or in another conduit located between the outlet conduit and the fluid dispenser. The second conduit may be selectively opened, either manually by the user or in response to the detection of the user's hand proximate to the fluid dispenser, to cause fluid to be dispensed. When fluid is to be dispensed from the fluid dispenser, the valves located in the inlet conduit and the outlet conduit are preferably opened simultaneously. When the dispensing of fluid from the fluid dispenser is to be stopped, for example after a predetermined time or after a predetermined amount of fluid has been dispensed, the valve located in the inlet conduit is preferably closed before the valve located in the outlet conduit. This prevents an undesirably high static pressure from being generated within the cooling jacket.

A heater may be provided for heating fluid located within the outlet conduit to form the fluid which is dispensed from the fluid dispenser. Through the heat exchanger raising the temperature of the fluid as it passes through the receptacle, less power is required to further heat the fluid to the required dispensing temperature. At least part of the heater may be surrounded by the raised section of the base to reduce the length of any exposed section of the outlet conduit located between the jacket and the heater.

Alternatively, the outlet conduit may convey fluid from the cooling jacket to a thermostatic mixing valve having a first inlet for receiving fluid from the outlet conduit, a second inlet for receiving a relatively hot fluid, and an outlet connected to the fluid dispenser. The relatively hot fluid may be a boiler-heated fluid which is mixed with the fluid received from the cooling jacket to provide a mixed fluid which is supplied to the fluid dispenser to form the dispensed fluid. In this case, less boiler-heated fluid is required to provide a mixed fluid at the required dispensing temperature, thereby reducing the amount of energy consumed by the boiler. Again, at least part of the thermostatic mixing valve may be surrounded by the raised section of the base to reduce the length of any exposed section of the outlet conduit located between the jacket and the thermostatic mixing valve. In this case, a valve for inhibiting the dispensing of fluid from the fluid dispenser may be located between the thermostatic mixing valve and the fluid dispenser.

As an alternative to conveying fluid from the cooling jacket of a receptacle to the fluid dispenser for dispensing fluid into that receptacle, the fluid from the cooling jacket may be conveyed to a fluid dispenser of an adjacent sink unit. As another alternative, the sink unit may form part of a series of sink units connected to a common mains water supply for supplying cold water to the cooling jackets of the receptacles of the sink units. The water exhausted from the cooling jackets may then be conveyed to a common thermostatic mixing valve for mixing the water received from the receptacles of the sink units with hot water received from the boiler or other heater to provide a mixed fluid which is then supplied to the fluid dispensers of the sink units to form the dispensed fluid.

In a third aspect the present invention provides a hand washing station, for example a sink unit, comprising a receptacle with a raised section having a convex external surface, a fluid dispenser for dispensing a relatively hot fluid on to the convex external surface, and means for conveying a relatively cold fluid adjacent or over an internal surface of the raised section of the receptacle.

In a fourth aspect the present invention provides a hand washing station, for example a sink unit, comprising a receptacle having a base and a side wall connected to the base, and means for conveying a relatively cold fluid adjacent or over an internal surface of the side wall of the receptacle.

In a fifth aspect the present invention provides a hand washing station, for example a sink unit, comprising a receptacle, a fluid dispenser for dispensing a relatively hot fluid into the receptacle, and a heat exchanger for transferring heat from relatively hot fluid within the receptacle to a relatively cold fluid.

In a sixth aspect, the present invention provides a hand washing station, for example a sink unit, comprising a fluid dispenser, a receptacle having a drain, a heat exchanger located above the drain and on to which the fluid dispenser is arranged to dispense fluid, and means for conveying a second fluid adjacent or over an internal surface of the heat exchanger. The heat exchanger is preferably connected to a base of the receptacle. The heat exchanger may form a side wall of the receptacle, and/or at least part of a base of the receptacle.

Features described above in connection with the first aspect of the invention are equally applicable to each of the second to sixth aspects of the invention, and vice versa.

BRIEF DESCRIPTION OF THE DRAWINGS

Preferred features of the invention will now be described, by way of example only, with reference to the accompanying drawings, in which.

DETAILED DESCRIPTION OF THE INVENTION

Figure 1:
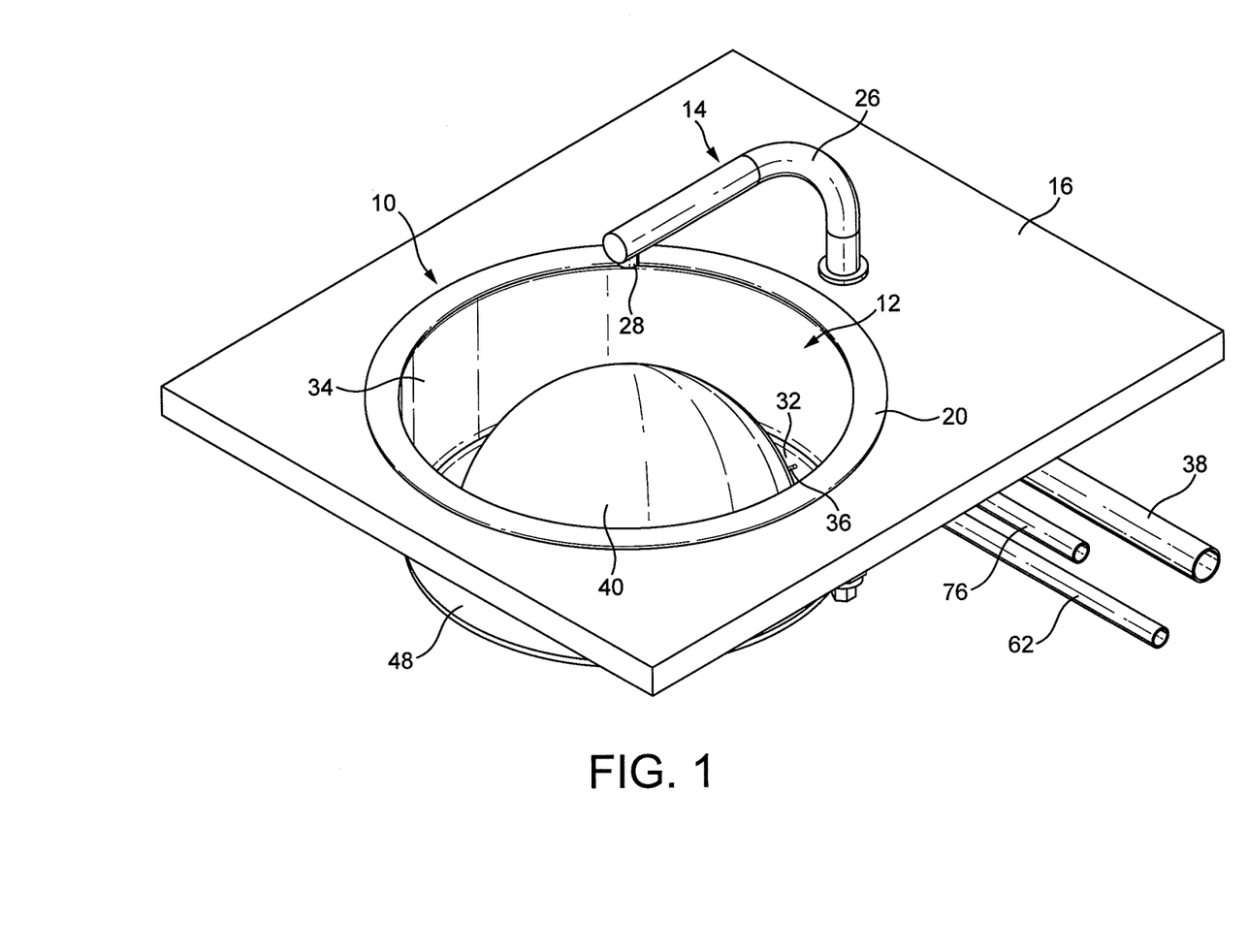
FIG. 1 is a perspective view, from above, of a sink unit.
Figure 2:
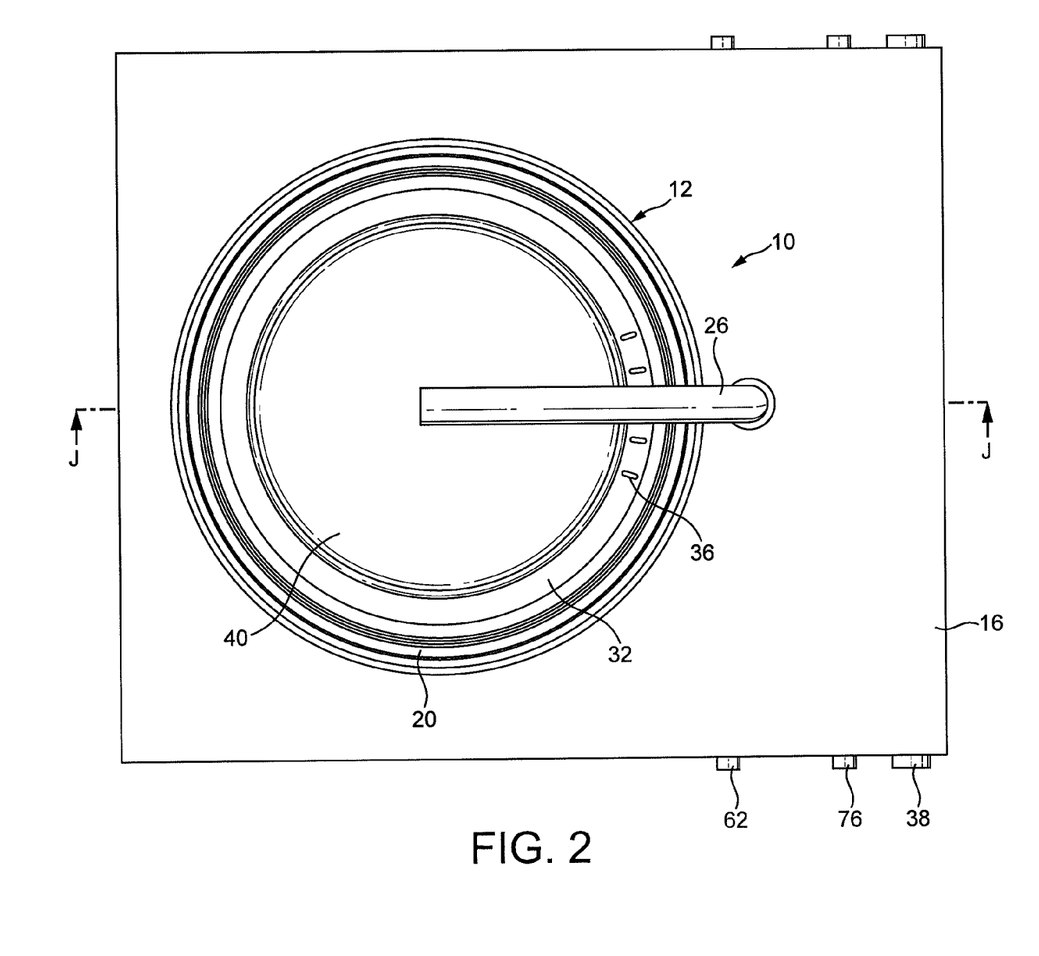
FIG. 2 is a top view of the sink unit.
Figure 3:
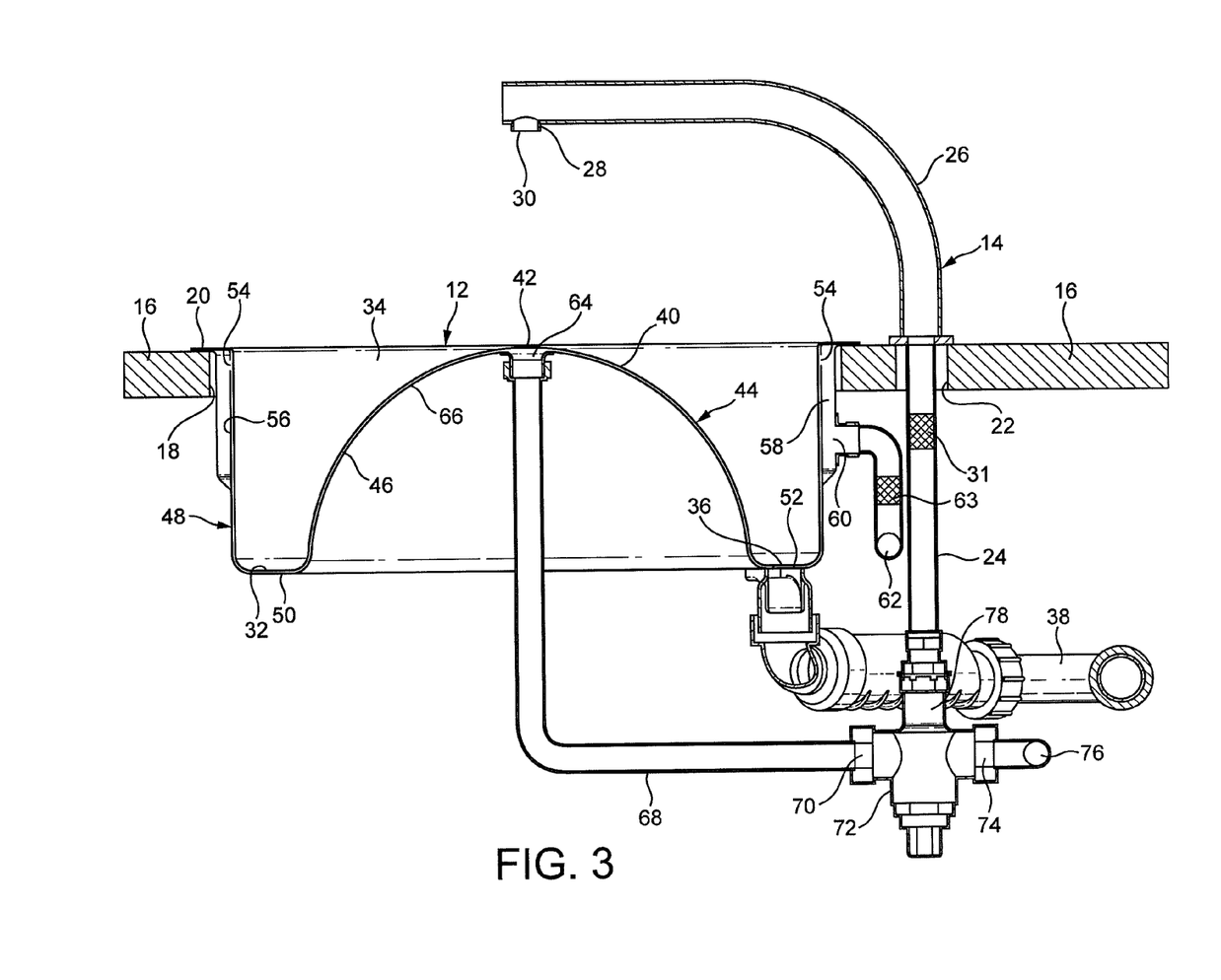
FIG. 3 is a side sectional view taken along line J-J in FIG. 2, illustrating a system for conveying fluid from the receptacle of the sink unit to the fluid dispenser of the sink unit.

With reference to FIGS. 1 to 3, an example of a hand washing station comprises a fluid dispenser and a receptacle for receiving the dispensed fluid. In this example, the hand washing station is in the form of a sink unit 10, which comprises a receptacle in the form of a bowl or basin 12 and a fluid dispenser 14 for dispensing fluid into the basin 12. In this example, the basin 12 and the fluid dispenser 14 are each installed on a counter 16. The fluid dispenser 14 is located adjacent to the basin 12, but depending on the design of the sink unit 10 the fluid dispenser 14 may be connected directly to the basin 12 or on to a wall located adjacent to the basin 12. The counter 16 has a first aperture 18 into which the basin 12 is inserted so that a rim 20 of the basin 12 is supported by the upper surface of the counter 16. Alternatively, the basin 12 may be connected to the lower surface of the counter 16 so as to be located directly beneath the first aperture 18. The counter 16 has a second aperture 22 through which fluid is conveyed to the fluid dispenser 14 by a dispenser supply pipe 24 connected to the fluid dispenser 14.

In this example, the fluid dispenser 14 is in the form of a tap for dispensing hot water into the basin 12. The fluid dispenser 14 comprises a main body 26 for receiving a flow of hot water from the dispenser supply pipe 24, and a spout 28 from which the hot water is dispensed into the basin 12. On demand, hot water for washing is supplied from the supply pipe 24 to the main body 26. The hot water runs inside the main body 26 and the spout 28 to an outlet 30 provided at the end of the spout 28. The fluid dispenser 14 is configured for "hands-free" operation using a conventional sensor and control loop which automatically opens a first stop valve 31 in the dispenser supply pipe 24 in response to detection of a user's hands in a washing position. Alternatively, the fluid dispenser 14 may be configured for manual operation.

In this example, the basin 12 has a generally circular outer periphery, but the basin 12 may have a rectangular or square periphery so as to define a volume of any desired size or shape for receiving the dispensed hot water. This volume is delimited by the external surface of a base 32, and the external surface of a side wall 34. The basin 12 comprises a drain 36 for exhausting dispensed hot water to a waste water pipe 38.

The base 32 has a central raised section 40. In this example, the raised section 40 has a convex external surface, which is preferably substantially hemispherical in shape. The apex 42 of the raised section 40 of the base 32 may be approximately level with the rim 20 of the basin 12 so that the side wall 34 surrounds the raised section 40 of the base 32. The outlet 30 of the spout 28 of the fluid dispenser 14 is arranged to convey a flow of hot water on to the raised section 40 of the base 32.

In this example, the outlet 30 of the spout 28 of the fluid dispenser 14 is located immediately above the apex 42 of the domed section 40 of the base 32 so that, in the absence of a user's hands beneath the spout 28, hot water is dispensed directly on to the apex 42 of the domed section 40 of the base 32. However, the fluid dispenser 14 may be arranged to direct the hot water on to a different part of the domed section 40 of the base 32. The drain 36 comprises a plurality of waste outlet ports formed in the base 32, and spaced about the raised section 40 of the base 32.

The basin 12 comprises a heat exchanger 44 for transferring heat from hot dispensed water within the basin 12 to a relatively cold fluid, in this example cold water. The heat exchanger 44 forms the external surface of the base 32 and the side wall 34 of the basin 12. In this example, the heat exchanger 44 comprises a sheet of metallic material, preferably a stainless steel. Material is removed from the sheet, for example by stamping or cutting, to form the fluid ports in the base 32 for conveying waste hot water to the waste water pipe 38. With reference to FIG. 4(a), the heat exchanger 44 may comprises a plurality of layers of sheet material. For example, an outer sheet 45a of stainless steel may provide the external surface 44a of the heat exchanger 44, whereas an inner sheet 45b of a different material, for example a plastics material, may provide the internal surface 44b of the heat exchanger 44. Alternatively, as illustrated in FIG. 4(b), the heat exchanger 44 may comprise a single sheet of material, for example a stainless steel, providing both the external surface 44a and the internal surface 44b of the heat exchanger 44.

The basin 12 includes a fluid passage for conveying cold water from a mains water supply over the internal surface 44b of the heat exchanger 44. In this example the fluid passage is located within the basin 12, and is in the form of a cooling jacket 46 which surrounds the internal surface 44b of the heat exchanger 44. With reference also to FIGS. 4(a) and 4(b), the cooling jacket 46 is delimited by the internal surface 44b of the heat exchanger 44 and the internal surface 48b of a casing 48 within which the heat exchanger 44 is located. The internal surface 48b of the casing 48 has substantially the same shape as the internal surface 44b of the heat exchanger 44 so that the cooling jacket 46 has a substantially constant thickness about the heat exchanger 44. The casing 48 may be formed from a material having a similar thermal conductivity as the heat exchanger 44, and so may also be formed from stainless steel. However, the casing 48 may be formed from, or have an external surface coated with, a thermally insulating material to inhibit the loss of heat from the external surface 48a of the casing 48. The casing 48 may be bonded, welded or otherwise joined at the base 32 and/or the side wall 34 to the heat exchanger 44 for strength, and to maintain a constant thickness of the cooling jacket 46.

The casing 48 defines a lower surface of the rim 20 of the basin 12. The heat exchanger 44 and the casing 48 are preferably connected together at the rim 20 of the basin 12, for example by welding or another suitable joining technique depending on the materials from which the heat exchanger 44 and the casing 48 are formed. The base 50 of the casing 48 is formed with a plurality of waste outlet ports which are aligned with the waste outlet ports of the base 32 of the heat exchanger 44 during assembly of the basin 12. Annular inserts 52 are inserted into the aligned waste outlet ports to isolate the drain 36 from the cooling jacket 46.

The cooling jacket 46 comprises a plurality of fluid inlet ports 54 formed at the upper end of a side wall 56 of the casing 48 for distributing cold water evenly about the internal surface 44b of the heat exchanger 44. The fluid inlet ports 54 are supplied with cold water by an annular distribution jacket 58 formed in the casing 48 and extending about the cooling jacket 46. The distribution jacket 58 may be thermally insulated from the cooling jacket 46. The distribution jacket 58 has an inlet 60 located towards the lower end thereof which is connected to a cold water supply pipe 62. The cold water supply pipe 62 may be connected to a mains water supply, in which case the cold water supply pipe 62 may comprise a pressure reducing valve for reducing the static pressure of the cold water before it enters the distribution jacket 58. For example, the pressure reducing valve may be arranged to reduce the static pressure of the cold water to around 0.5 bar to inhibit the generation of leaks in a seal or connection between the heat exchanger 44 and the casing 48. The cold water supply pipe 62 may also house a second stop valve 63 for selectively inhibiting the flow of cold water to the distribution jacket 58. The cooling jacket 46 comprises a fluid outlet port 64 located in a raised section 66 of the base 50 of the casing 48. The fluid outlet port 64 is located opposite to the apex 42 of the raised section 40 of the base 32 of the heat exchanger 44.

The sink unit 10 includes a system for conveying cold water from the basin 12 to the fluid dispenser 14. In this example, the fluid outlet port 64 of the cooling jacket 46 is connected to an outlet pipe 68 for conveying water from the cooling jacket 46 to a first inlet 70 of a thermostatic mixing valve 72. The mixing valve 72 has a second inlet 74 connected to a hot water supply pipe 76, and an outlet 78 connected to the dispenser supply pipe 24. The hot water supply pipe 76 may be connected to a boiler or other source of hot water. As illustrated, the thermostatic mixing valve 72 is located externally of the basin 12, but the thermostatic mixing valve 72 may be located beneath the casing 48 so that it is at least partially surrounded by the raised section 66 of the base 50 of the casing 48. This can provide the sink unit 10 with a more compact configuration.

When the inlet 60 of the distribution jacket 58 is first connected to the cold water supply pipe 62, the second stop valve 63 is opened so that the distribution jacket 58 becomes filled with cold water. A bleed valve may be located in the rim 20 of the basin 12 to expel air displaced as the distribution jacket 58 fills with water. The cold water enters the cooling jacket 46 through the fluid inlet ports 54 and flows through the cooling jacket 46 to the fluid outlet port 64. The cold water flows through the outlet pipe 68 to the thermostatic mixing valve 72, where the cold water mixes with hot water received from the hot water supply pipe 76. Warm water exhausted from the thermostatic mixing valve 72 enters the dispenser supply pipe 24 connected to the fluid dispenser 14. With the first stop valve 31 in a closed position, no water is dispensed from the spout 28. Any air displaced from the cooling jacket 46 and outlet pipe 68 as these conduits fill with cold water is expelled from the spout 28 when the fluid dispenser 14 is first operated. Once the cooling jacket 46, the distribution jacket 58 and the outlet conduit 68 have filled with water, the second stop valve 63 is closed.

The basin 12 is thus normally in a state in which the cooling jacket 46 is filled with cold water. Heat may then be transferred between the water within the cooling jacket 46 and the air in the ambient atmosphere. For example, in the event that the temperature of the ambient atmosphere is greater than that of the water within the cooling jacket 46, heat will be transferred through the heat exchanger 44 to the water within the cooling jacket 46. Depending on the material from which the casing 48 is formed, heat may also be transferred from the ambient atmosphere through the casing 48 to the water within the cooling jacket 46. On the other hand, in the event that the temperature of the ambient atmosphere is lower than that of the water within the cooling jacket 46, heat will be transferred through the heat exchanger 44 from the water within the cooling jacket 46 to the ambient atmosphere. Again, depending on the material from which the casing 48 is formed, heat may also be transferred to the ambient atmosphere through the casing 48.

When a user actuates the second stop valve 63, warm water is dispensed from the fluid dispenser 14. The first stop valve 31 is opened simultaneously with the second stop valve 63, for example by a controller for actuating, or detecting actuation of, the second stop valve 63. As warm water is dispensed from the fluid dispenser 14, the water within the sink unit 10 is replenished. Cold water is drawn through the cold water supply pipe 62, the dispensing jacket 58, the cooling jacket 46 and the outlet pipe 68, and hot water is drawn through the hot water supply pipe 76. When the user's hands are not located beneath the spout 28, for example immediately following actuation of the first stop valve 31, the dispensed warm water impinges upon the apex 42 of the raised section 40 of the base 32. The dispensed warm water runs down the external surface 44a of the raised section 40 and into the gully located between the side wall 34 and the raised section 40. The shape of the raised section 40 causes the dispensed warm water to disperse evenly about the raised section 40 and pass in a generally laminar flow towards the gully. Within the gully, the dispensed warm water runs towards the drain 36, from where it is exhausted into the waste water pipe 38.

As the dispensed warm water runs over the raised section 40 of the base 32, heat is transferred through the heat exchanger 44 from the dispensed warm water to the cold water flowing within the cooling jacket 46 towards the fluid outlet port 64 located opposite to the apex 42. Heat is also transferred through the heat exchanger 44 to the cold water within the cooling jacket 46 from the dispensed warm water running within the gully to the drain 36.

When the user's hands are located beneath the spout 28, most of the dispensed water continues to fall from the user's hands on to the raised section 40 of the base 32. The introduction of soap into the dispensed water from the user's hands can assist with the spreading of the dispensed water over the raised section 40 of the base 32, through the reduced surface tension of the soapy water. Some of the dispensed warm water may splash from the user's hands on to the side wall 34. This warm water runs over the external surface 44a of the heat exchanger 44 and into the gully. As the warm water runs over the external surface 44a of the heat exchanger 44, heat is transferred from this warm water to the cold water flowing within the cooling jacket 46 over the internal surface 44b of the heat exchanger 44. Once an amount of warm water has been dispensed from the fluid dispenser 14, the second stop valve 63 is closed before the first stop valve 31 is closed to prevent an undesirably high static pressure from being generated within the cooling jacket 46.

The transfer of heat from the dispensed warm water located within the basin 12, and also from the ambient atmosphere surrounding the basin 12, to the cold water within the cooling jacket 46 raises the temperature of the cold water before it is supplied to the thermostatic mixing valve 72. For example, if water at a temperature of 40° C. is dispensed from the spout 28 at a flow rate of 2 liters per minute for 10 seconds, the transfer of heat through a 0.7 mm thick stainless steel heat exchanger 44 can raise the temperature of the cold water within the cooling jacket 46 from a temperature of around 18° C. at the fluid inlet ports 54 to a temperature of around 28° C. at the fluid outlet port 64. This increase in the temperature of the cold water conveyed to the thermostatic mixing valve 72 can significantly reduce the amount of hot water that needs to be mixed with the cold water to produce warm water of a required dispensing temperature, in this example of around 40° C. at the spout 28. A reduction in the amount of hot water required to produce the dispensed warm water can provide energy savings through reducing the energy expenditure of the boiler or other means for heating water to produce the hot water.

Figure 5:
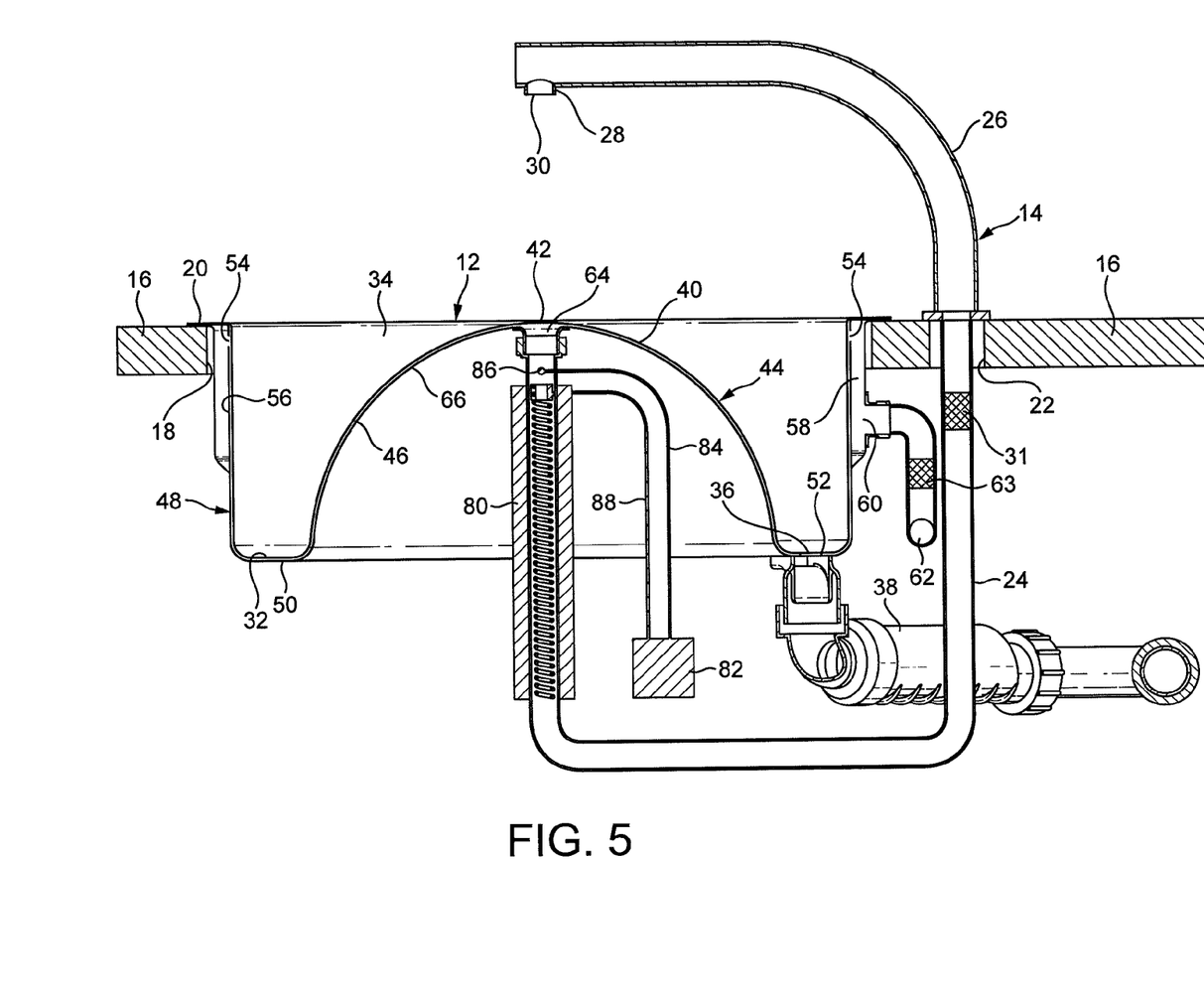
FIG. 5 is another side sectional view taken along line J-J in FIG. 2, illustrating an alternative system for conveying fluid from the receptacle of the sink unit to the fluid dispenser of the sink unit.

FIG. 5 illustrates an alternative system for supplying water from the basin 12 to the fluid dispenser 14. This system varies from that illustrated in FIG. 3 insofar as the dispenser supply pipe 24 is connected to the fluid outlet port 64 of the cooling jacket 46 via an electric heater 80 for heating fluid exhausted from the cooling jacket 46. At least part of the heater 80 is surrounded by the raised section 40 of the base 32 so as to reduce the length of any piping between the fluid outlet port 64 and the heater 80. The sink unit 10 includes a controller 82 connected by a first control line 84 to a thermocouple 86 for detecting the temperature of the water exhausted from the cooling jacket 46. The controller 82 is connected to the heater 80 by a second control line 88 for actuating the heater 80 to raise the temperature of the water exhausted from the cooling jacket 46 to a desired dispensing temperature, for example 40° C. at the spout 28. As the temperature at which water is exhausted from the cooling jacket 46 will vary, for example, depending on variables such as the ambient temperature, and the frequency of use of the fluid dispenser 14, the controller 82 may vary the power supplied to the heater 80 depending on the detected temperature so that warm water is dispensed from the fluid dispenser 14 at the desired temperature.

In this example, the advantage provided by heating cold water within the cooling jacket 46 from a temperature of around 18° C. at the fluid inlet ports 54 to a temperature of around 28° C. at the fluid outlet port 64 is that less energy is required at the heater 80 to heat the cold water exhausted from the fluid outlet port 64 to the desired dispensing temperature. For example, whereas around 3,000 W of energy may be required to heat water from 18° C. to be dispensed from the spout 28 at a temperature of 40° C. at a flow rate of 2 liters per minute, only around 1,680 W of energy may be required to heat the same flow rate of water from a temperature of 28° C. for dispensing from the spout 28 at 40° C.

Figure 6:
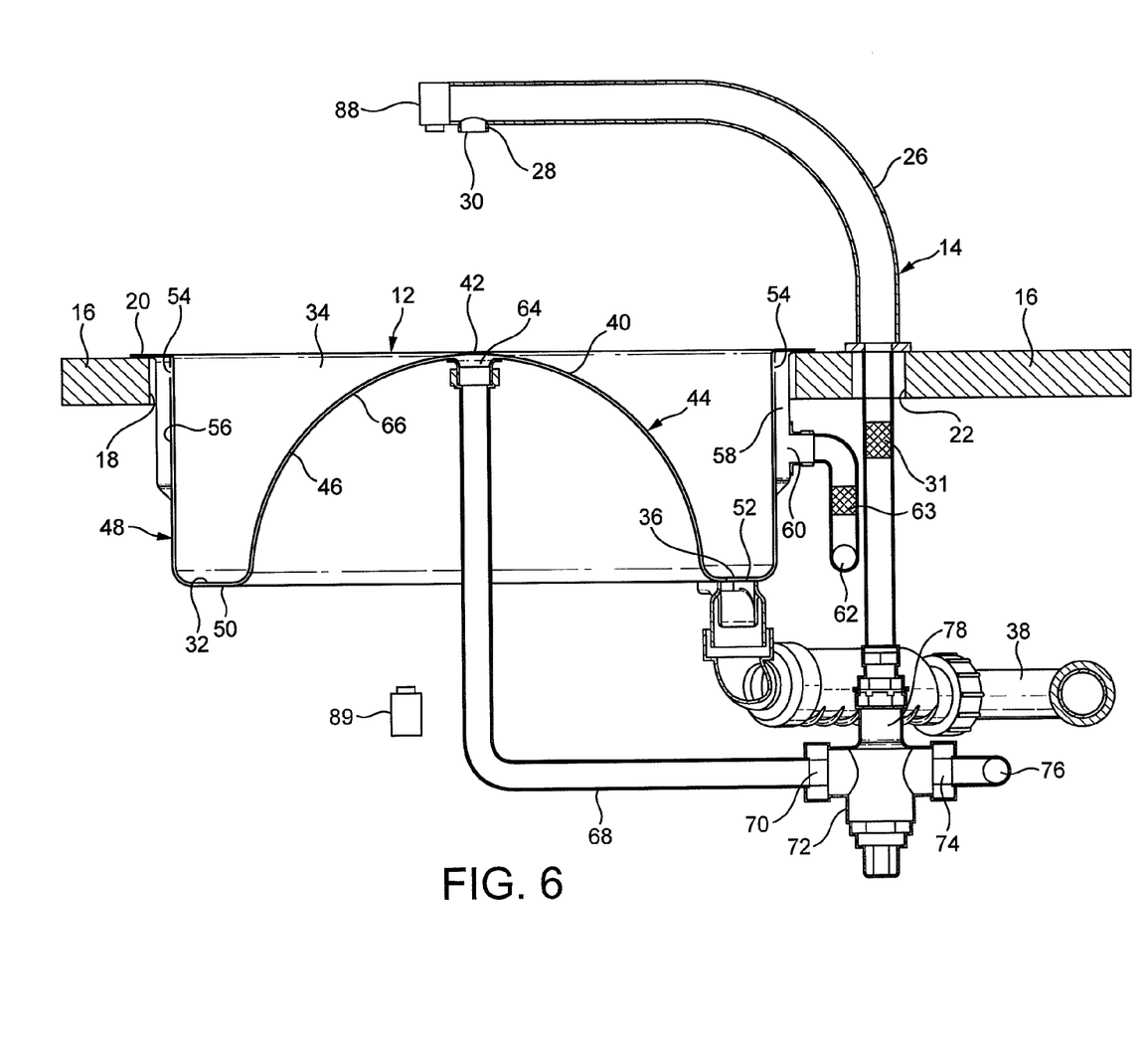
FIG. 6 is a similar view to FIG. 3, illustrating an air dispenser for dispensing air adjacent to the receptacle of the sink unit.

FIG. 6 illustrates a modification of the arrangement illustrated in FIG. 3, and in which at least one air dispenser 88 is located adjacent to the basin 12 for circulating an air flow within the ambient atmosphere of the sink unit 10. The arrangement illustrated in FIG. 5 may be similarly modified. In this example, the sink unit 10 includes a first fan 88 located above the counter 16. The first fan 88 may be located on the fluid dispenser 14, or it may be located elsewhere, for example adjacent the fluid dispenser 14. Depending on the relative temperatures of the water within the cooling jacket 46 and the ambient atmosphere, heat may be conveyed through the heat exchanger 44 either to the water within the cooling jacket 46 or to the air in the ambient atmosphere. As illustrated in FIG. 6, when the casing 48 is formed from a thermally conductive material, a second fan 89 may be located beneath the counter 16 so as to convey air over or adjacent the external surface 48a of the casing 48, which then acts as a heat exchanger for transferring heat between the air in thermal contact with the external surface of the casing 48 and the water within the cooling jacket 46. Of course, the second fan 89 may be provided as an alternative to the first fan 88.

Figure 4:
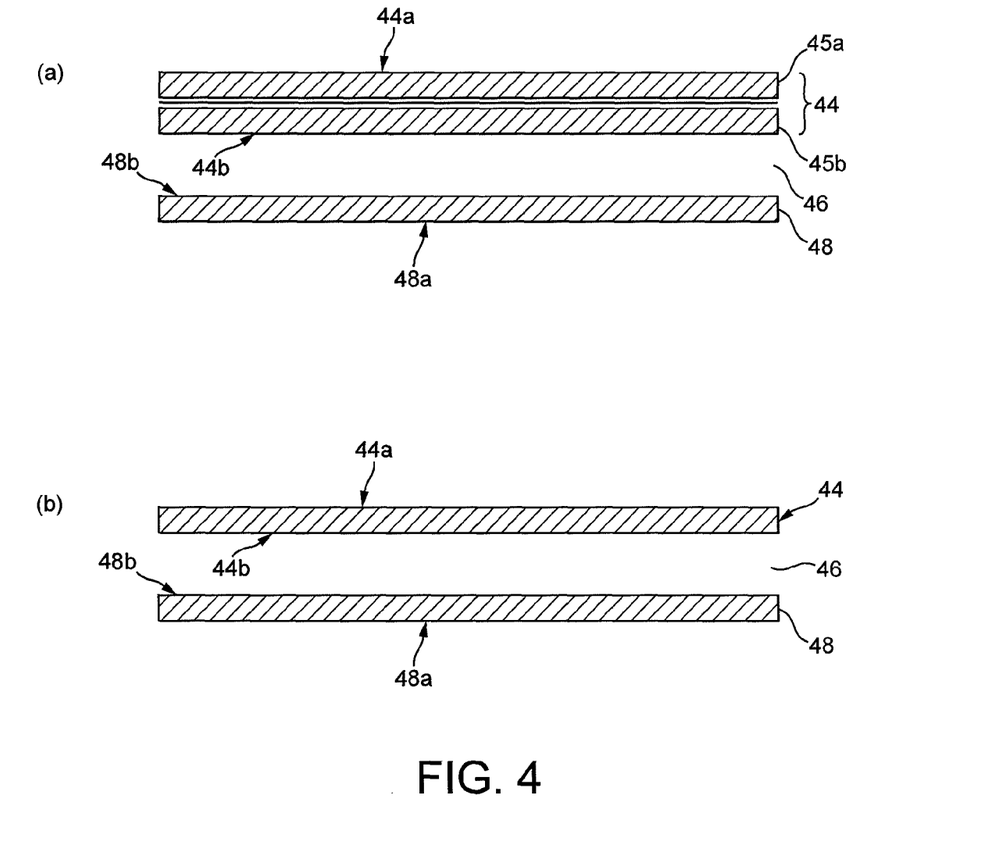
FIG. 4(a) is a detailed sectional view of a first example of the heat exchanger of the sink unit.
FIG. 4(b) is a detailed sectional view of a second example of the heat exchanger of the sink unit.

The sink unit 10 may be installed within a public washroom including a series of sink units. Each of the sink units 10 may be configured as illustrated in FIG. 4, so that each sink unit 10 has a respective heater 80, or as illustrated in FIG. 3 or FIG. 6, so that each sink unit 10 includes a respective thermostatic mixing valve 72 for mixing cold water received from the cooling jacket 46 with hot water supplied from a respective hot water supply pipe 76. Alternatively, each thermostatic mixing valve 72 may be connected to a common hot water supply pipe 76.

Figure 7:
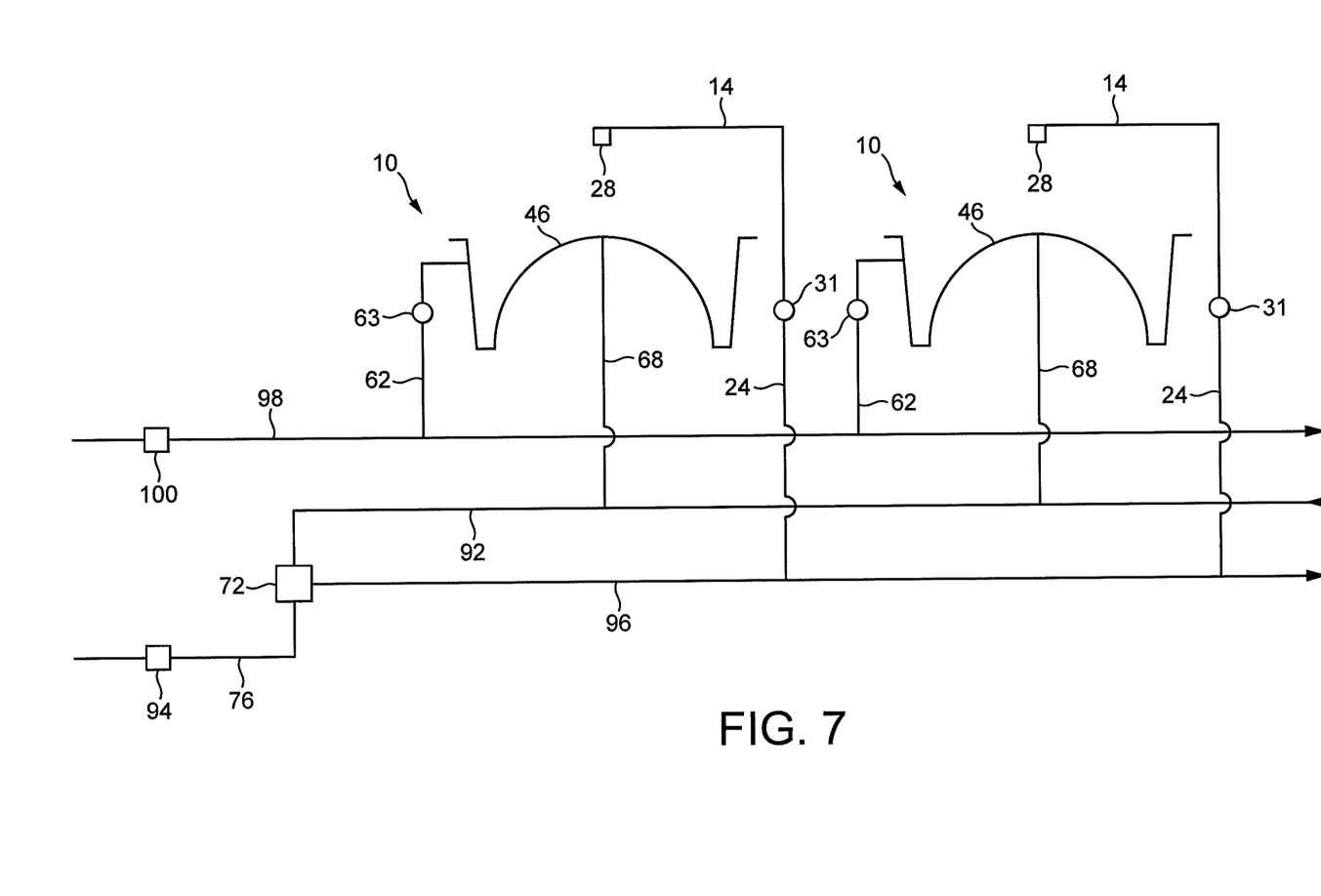
FIG. 7 is a schematic illustration of the fluid paths in a washroom comprising a plurality of sink units.

As an another alternative, as illustrated schematically in FIG. 7 the outlet pipe 68 of each sink unit 10 may be connected to an inlet conduit 92 for conveying water from each sink unit 10 to a common thermostatic mixing valve 72 connected to the hot water supply pipe 76. A pressure reducing valve 94 may be provided in the hot water supply pipe 76 for reducing the static pressure of the hot water to around 1 bar before it enters the thermostatic mixing valve 72. An outlet conduit 96 receives a mixed fluid from the thermostatic mixing valve 72 and conveys the mixed fluid to the dispenser supply pipe 24 of each sink unit 10. The cold water supply pipe 62 of each sink unit 10 is connected to a common mains water supply pipe 98. The mains water supply pipe 98 may also include a pressure reducing valve 100 for reducing the static pressure of the cold water to around 1 bar before it enters the cold water supply pipes 62 of the sink units 10.

The invention claimed is:

1. A hand washing station comprising a receptacle having a drain, and a fluid dispenser for dispensing fluid into the receptacle, the receptacle comprising a heat exchanger for transferring heat between the dispensed fluid and a second fluid, the heat exchanger forming at least part of an external surface of the receptacle, wherein the receptacle comprises a fluid conveying system arranged to convey a flow of the second fluid adjacent to an internal surface of the heat exchanger, and wherein the fluid conveying system is arranged to convey the flow of the second fluid internally towards an apex of a convex section of the heat exchanger.

2. The hand washing station as claimed in claim 1, wherein the heat exchanger forms at least part of a convex external surface of the receptacle.

3. The hand washing station as claimed in claim 1, wherein the heat exchanger forms at least part of an external surface of the receptacle which has a substantially spherical curvature.

4. The hand washing station as claimed in claim 1, wherein the fluid dispenser is arranged to dispense fluid on to the heat exchanger.

5. The hand washing station as claimed in claim 1, wherein the heat exchanger has a hydrophilic external surface.

6. The hand washing station as claimed in claim 1, wherein the heat exchanger forms at least part of an external surface of the base of the receptacle.

7. The hand washing station as claimed in claim 6, wherein the heat exchanger forms at least part of a raised section of the base.

8. The hand washing station as claimed in claim 7, wherein the raised section of the base is convex in shape.

9. The hand washing station as claimed in claim 7 or claim 8, wherein the raised section of the base has a substantially spherical curvature.

10. The hand washing station as claimed in claim 7, wherein the receptacle comprises a side wall having an external surface extending about the raised section of the base.

11. The hand washing station as claimed in claim 10, wherein the heat exchanger forms at least part of the external surface of the side wall of the receptacle.

12. The hand washing station as claimed in claim 10 or claim 11, wherein the drain is located between the side wall and the raised section of the base.

13. The hand washing station as claimed in claim 7, wherein the fluid dispenser is arranged to dispense fluid directly on to the raised section of the base.

14. The hand washing station as claimed in claim 1, wherein the fluid conveying system is arranged to convey a flow of the second fluid over the internal surface of the heat exchanger.

15. The hand washing station as claimed in claim 1, wherein the fluid conveying system is arranged to convey a flow of the second fluid over or adjacent to the internal surface of the heat exchanger in a direction substantially opposite to that in which the dispensed fluid flows over the external surface of the heat exchanger.

16. The hand washing station as claimed in claim 1, wherein the fluid conveying system comprises a jacket delimited at least in part by the internal surface of the heat exchanger.

17. The hand washing station as claimed in claim 16, wherein the jacket comprises at least one fluid inlet port.

18. The hand washing station as claimed in claim 16, wherein the jacket comprises a fluid outlet port.

19. The hand washing station as claimed in claim 18, wherein the jacket comprises a domed section, and the fluid outlet port is located at an apex of the domed section of the jacket.

20. The hand washing station as claimed in claim 1, comprising an outlet conduit for conveying second fluid from the fluid conveying system.

21. The hand washing station as claimed in claim 20, comprising a heater for heating fluid located within the outlet conduit.

22. The hand washing station as claimed in claim 20, comprising a mixer having a first inlet for receiving fluid from the outlet conduit, a second inlet for receiving a relatively hot fluid, and an outlet connected to the fluid dispenser.

23. A plurality of hand washing stations, each as claimed in claim 1 and comprising a respective outlet conduit, the outlet conduits of the hand washing stations being connected to a common mixer for mixing a hot fluid with fluid received from the outlet conduits to form fluid for dispensing from the fluid dispensers of the hand washing stations.

* * * * *